United States Patent
Geveke et al.

(10) Patent No.: US 8,973,492 B1
(45) Date of Patent: Mar. 10, 2015

(54) METHOD AND APPARATUS FOR PASTEURIZING SHELL EGGS USING RADIO FREQUENCY HEATING

(71) Applicants: The United States of America, as represented by the Secretary of Agriculture, Washington, DC (US); Trustees of Princeton University, Princeton, NJ (US)

(72) Inventors: David J. Geveke, Brookhaven, PA (US); Andrew B. W. Bigley, Jr., Levittown, PA (US); Christopher D. Brunkhorst, Oxford, NJ (US)

(73) Assignees: The United States of America, as represented by the Secretary of Agriculture, Washington, DC (US); Trustees of Princeton University, Princeton, NJ (US)

( * ) Notice: Subject to any disclaimer, the term of this patent is extended or adjusted under 35 U.S.C. 154(b) by 0 days.

(21) Appl. No.: 13/796,115

(22) Filed: Mar. 12, 2013

(51) Int. Cl.
*A23G 1/10* (2006.01)
*A23B 5/005* (2006.01)

(52) U.S. Cl.
CPC .................................. *A23B 5/0052* (2013.01)
USPC ........................................... 99/485; 426/241

(58) Field of Classification Search
USPC ......... 426/241, 614, 234, 237, 298, 399, 407, 426/521
See application file for complete search history.

(56) References Cited

U.S. PATENT DOCUMENTS

| | | | | |
|---|---|---|---|---|
| 2,583,128 A | * | 1/1952 | Stevenson et al. | 333/100 |
| 3,830,945 A | * | 8/1974 | Scharfman | 426/243 |
| 6,090,425 A | * | 7/2000 | Samimi | 426/399 |
| 6,406,727 B1 | * | 6/2002 | Hamid-Samimi et al. | 426/241 |
| 2006/0013927 A1 | | 1/2006 | Geveke et al. | |

FOREIGN PATENT DOCUMENTS

EP  1 746 898 B1  9/2008

* cited by examiner

*Primary Examiner* — Henry Yuen
*Assistant Examiner* — Phuong Nguyen
(74) *Attorney, Agent, or Firm* — John D. Fado; Robert D. Jones; Lesley Shaw

(57) ABSTRACT

Radio frequency (RF) energy is used to quickly heat the yolk portion of a shell egg. An anode and corresponding cathode are applied to each individual egg. As the egg is selectively and systematically rotated, RF energy and a stream of cooling fluid (preferably water) are simultaneously applied to the egg. This initiates pasteurization of the egg yolk while maintaining a low temperature in the heat-sensitive albumen (egg white) thus preventing denaturation of the albumen. Immediately after the RF yolk heating process, the egg is placed in a hot water bath designed to rapidly pasteurize the albumen as well as to minimize heat loss from the yolk and pasteurize any portion of the yolk that is not already pasteurized through the RF yolk heating process.

20 Claims, 2 Drawing Sheets

METHOD AND APPARATUS FOR PASTEURIZING SHELL EGGS USING RADIO FREQUENCY HEATING

FIELD OF THE INVENTION

The disclosed method and apparatus relates to pasteurizing shell eggs. Specifically, the method and apparatus described herein relates to at least partially pasteurizing egg yolks with radio frequency (RF) heating and then completing the yolk pasteurization process as well as pasteurizing the egg whites (i.e. the "albumen") using a variation of conventional methods.

BACKGROUND OF THE INVENTION

Nearly 200 million "shell eggs" are consumed in the United States (US) each day. "Shell eggs" are non-powdered conventional eggs that are naturally produced by hens. Shell eggs are among the most nutritious foods on earth and can be part of a healthy diet. However, some unbroken, clean, fresh shell eggs may contain bacteria that can cause foodborne illness. While the number of eggs affected is quite small, 30% of the US population is highly susceptible to bacteria that may be found in eggs. Pregnant women, infants and young children, the elderly, and the immunocompromised are particularly at risk. Shell eggs topped the list of "Riskiest Federal Drug Administration—Regulated Foods" and had the most documented outbreaks from 1990 to 2006. The US Department of Agriculture estimates that pasteurization of all shell eggs in the US would reduce the annual number of illnesses by more than 110,000.

Currently only two companies in the US pasteurize shell eggs. Both companies use a hot water immersion process whereby the eggs are submerged in hot (approximately 56.7° C.) water for about 60 minutes. While long exposure to high temperatures is required to pasteurize the egg yolk, the high temperatures damage and degrade the quality of the albumen. Albumen damage can occur when the albumen is subjected to a temperature of 57° C., or held at 49° C. for 60 min. The albumen damage is manifested by varying amounts of coagulation and/or denaturation. By contrast, egg yolk can withstand temperatures of 64° C., or more, without being damaged.

Attempts have also been made to pasteurize eggs using microwave-based processes and at least one prior art patent discloses the use of radio frequency (RF) energy to pasteurize shell eggs. However these prior art processes proved to be inefficient and damaging to the targeted eggs.

Penetration depth of electromagnetic energy increases as the frequency decreases. Thus RF energy, in the range of 10 to 100 MHz can have a penetration depth ten times greater than that of microwave energy (2.45 GHz). Consequently, the deeper penetration of RF energy should heat the yolk better than microwave energy.

The current inventors' method and apparatus uses RF energy to directly and preferentially heat the egg yolk as the targeted egg is rotated, rather than to first heat the albumen and then the yolk (as is conventionally done by conduction heating a non-rotating egg). By using RF energy to heat the egg yolk directly, the process described herein is more efficient and avoids damage to the albumen. The inventors' method and apparatus quickly heats the yolk to inactivate pathogenic bacteria using RF energy. After the yolk reaches pasteurization temperature, the albumen is rapidly pasteurized using conventional methods. The net effect of the inventor's disclosed method and apparatus is to rapidly pasteurize shell eggs with minimal damage to quality and significant savings in time and other resources.

SUMMARY OF THE INVENTION

This disclosure is directed to a system for pasteurizing shell eggs. The system includes an egg rotating assembly structured to rotate the egg, and at least one electrode that is in contact with the egg. The system is structured so that, as the rotating assembly rotates the egg, radio frequency energy is directed to the egg to pasteurize at least a portion of the egg.

This disclosure is also directed to a method of pasteurizing a shell egg. In accordance with the method, at least one electrode is placed in contact with a rotating egg. As the egg rotates, radio frequency energy is applied to the egg to pasteurize at least a portion of the egg.

DETAILED DESCRIPTION OF PREFERRED EMBODIMENTS

As discussed above, the presence of bacteria (particularly *Salmonella enteritidis*) is a health concern for consumers of shell eggs—particularly uncooked shell eggs. In contaminated eggs, the *Salmonella* bacteria are often found in the egg yolk. While prior art methods pasteurize egg yolks by applying heat to the outside of the eggs, the method and apparatus described herein at least partially pasteurizes egg yolks by focusing heat on the center (including the yolk) of the eggs, which is both efficient and effective at destroying any harmful bacteria present.

As used herein, the terms "pasteurization" and "pasteurize(d)" refer to treatments sufficient to kill pathogenic microorganisms contained within the shell egg being treated and thereby eliminate the threat of consumer exposure to effective amounts of (for example) *Salmonella*. Pasteurization methods cause about a five log cycle (99.999%) reduction of *Salmonella* bacteria.

Additionally, as used herein, the phrase "at least partially pasteurizes a portion of the egg" means that the temperature of at least a portion of the egg is raised to a pasteurizing temperature so that pathogenic microorganisms within that portion of the egg are killed. In the preferred embodiment, a portion of the egg that is at least partially pasteurized by RF energy is within the egg yolk.

Figure 1:
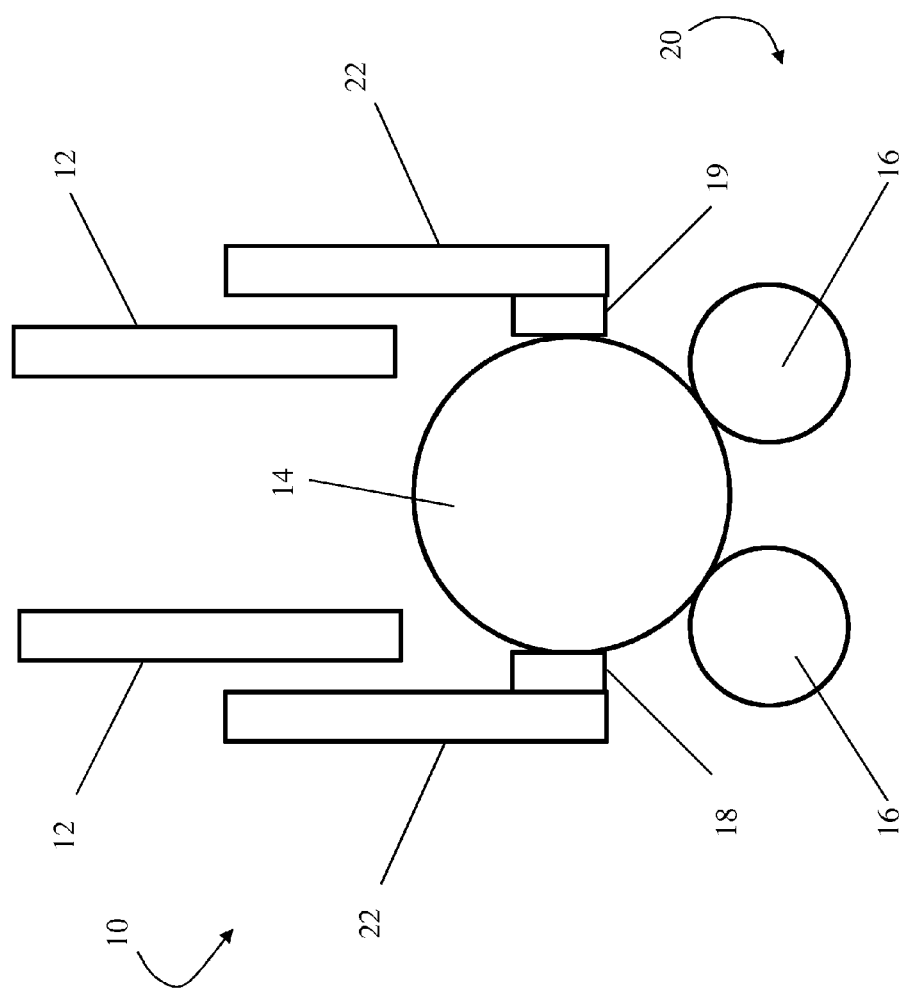
FIG. 1 is a schematic view of the inventor's preferred pasteurizing apparatus.

The preferred embodiment of the inventors' pasteurizing apparatus 10 is generally shown in FIG. 1. The apparatus 10 includes an active electrode 18 and a grounded electrode 19 disposed on opposite sides of the egg 14, and two cooling fluid applicators 12 that direct cooling fluid (preferably water) onto a target egg 14. Specifically, tepid water is directed onto the egg 14 during the initial pasteurization process. In the preferred embodiment, the tepid water is about 35° C., but may be in the range of 25 to 45° C., although broader ranges may also be functional and should be considered within the scope of the invention. In an alternative embodiment, the entire apparatus 10 is submerged in a water bath during and/or after the initial pasteurization process.

Note that, during the yolk RF heating process, water is applied to the outer shell of the egg 14 to cool the egg 14, whereas, during the albumen pasteurization process (and conventionally), water is applied to the outer shell to heat the egg 14 albumen.

As the water runs over the egg 14, the egg 14 is rotated by a rotating assembly 20. The rotating assembly 20 comprises at least a pair of rollers 16 which slowly rotate the egg 14, preferably at about 15 revolutions per minute, however the rotation speed may vary and may be in the range of 5 to 25 revolutions per minute. In the preferred embodiment, the roller assembly 20 includes at least one electrical motor in communication with the rollers 16. In additional alternative embodiments, the roller assembly 20 may include any rotating means and drive mechanisms known in the art.

In alternative embodiments, the electrodes 18, 19 may be rotated around a (non-rotating) stationary egg 14 and thereby achieve a similar effect. In further alternative embodiments, more than one pair of electrodes may be deployed around the circumference of the egg 14. In this embodiment, the electrodes emit RF energy in a predetermined pattern so that although the egg 14 and the electrode apparatus is stationary, RF energy is emitted from positions around the circumference of the egg 14, and thereby achieves an effect somewhat similar to the effect described above. For the purposes of simplicity and clarity, only one (midsized) active electrode 18 and one grounded electrode 19 are shown in schematic FIGS. 1 and 2. However embodiments incorporating more than one pair of electrodes 18, 19 and varying sizes and shapes of electrodes 18, 19 should be considered within the scope of the invention.

In further alternative embodiments, sensors 17 (see FIG. 2) associated with the electrodes 18, 19 monitor temperature and other parameters (such as resistance, inductance, etc.) of the egg 14 and rotate or apply RF energy (through the electrodes 18,19) to the egg 14 based on sensor 17 indications of the conditions within the egg 14. Specifically, one or both of the RF and the rotating assemblies are at least partially controllable by a sensor measuring directly or indirectly at least one property of the egg. There are multiple types of sensors 17 that (in communication with a controller) are capable of making determinations regarding the conditions (such as temperature, resistance, etc.) within the egg. For the purposes of simplicity and clarity, only one (midsized) sensor 17 is shown in schematic in FIG. 2. However embodiments incorporating more than one sensor 17 should be considered within the scope of the invention.

In the preferred embodiment, about 75 watts of RF energy is applied to the egg 14 through the electrodes 18, 19, which are positioned in the center of the egg 14 on opposing sides of the egg 14. In alternative embodiments, RF energy in the range of 5 to 200 watts may be applied. The 75 watts of RF energy is maintained preferably for about 5 minutes, however in alternative embodiments, the power may be maintained for a time ranging between 2 and 10 minutes, dependent on the size of the egg 14 and other factors associated with both the egg 14 and the apparatus 10.

The intensity and duration of the treatment may also be varied. For example, a power of 100 watts may be maintained for 2 minutes, followed by 75 watt power for one minute, and 50 watt power for one minute. The RF energy is preferably applied at 60 MHz, however in alternative embodiments, the energy may be applied at a frequency in the range of 1 to 100 MHz. In alternative embodiments, as described above, the treatments may also be varied based on sensor 17 indications of other parameters associated with the egg 14.

As shown in FIG. 1, in the preferred embodiment, the active electrode 18 and grounded electrode 19 are generally in the form of electrically conductive brushes that communicate energy through the moistened surface of the egg 14. The optimal size of the electrode brushes 18, 19 are about 60% of the (end to end) length of the egg. Directing the applicators 12 to apply the water to the brush-egg contact point improves the RF energy transfer from the brushes 18, 19 to the egg 14. The electrodes 18, 19 may alternatively be comprised of a copper mesh or other conductive materials. The electrodes 18, 19 are held in contact with the egg 14 by a pair of weighted arms 22. Alternatively the electrodes 18, 19 may be held in place to maintain contact with the egg 14 by a clamp, a spring, a retaining ring, or other means.

In an alternative embodiment (such as FIG. 2), the active electrode 18 is held in contact with the egg 14 by a single weighted arm 22, and the grounded electrode 19 forms at least a portion of an outer surface of one of the rollers 16. In another alternative embodiment, either one or both of the active electrode 18 and/or ground electrode 19 may comprise a weighted arm device and/or a portion of one or both of the rollers 16, or another portion of the roller assembly 20. In further alternative embodiments, the electrodes 18, 19 comprise an electrical conductance assembly that may contact the surface of the egg 14 by any means known in the art.

In operation, the individual devices described herein may be replicated multiple times so that the pasteurizing operation is "scaled up" for commercial production. Multiple examples of the apparatuses shown in FIG. 1 and/or FIG. 2 may be aggregated to form a pasteurizing array so that large numbers of eggs are pasteurized in a single commercial operation.

As the RF energy is applied to the egg 14, the temperature of the egg yolk is increased to preferably about 59° C., and the temperature of the albumen is maintained below 57° C. In alternative embodiments, the temperature of the yolk may be elevated to a temperature in the range of 57 to 60° C. At 60° C., 99.999% of the bacteria within the egg yolk are killed within about 3 minutes.

In the preferred embodiment, after the yolk is at least partially pasteurized, the egg 14 is immediately removed from the apparatus 10 and subjected to a hot water bath process. Specifically, the egg 14 is placed in a conventional hot (56 to 57° C.) water bath for about 20 minutes. In alternative embodiments the hot water may be applied from 7 to 25 minutes. Using this method, the albumen is heated to approximately 56.7° C. within about 5 minutes. Once the temperature of the albumen reaches 56.7° C., it takes about 2 additional minutes to kill 99.999% of any bacteria. In addition to heating the albumen, the hot water bath process also minimizes heat loss from the yolk and pasteurizes any portion of the yolk that is not already pasteurized through the RF heating process.

Figure 2:
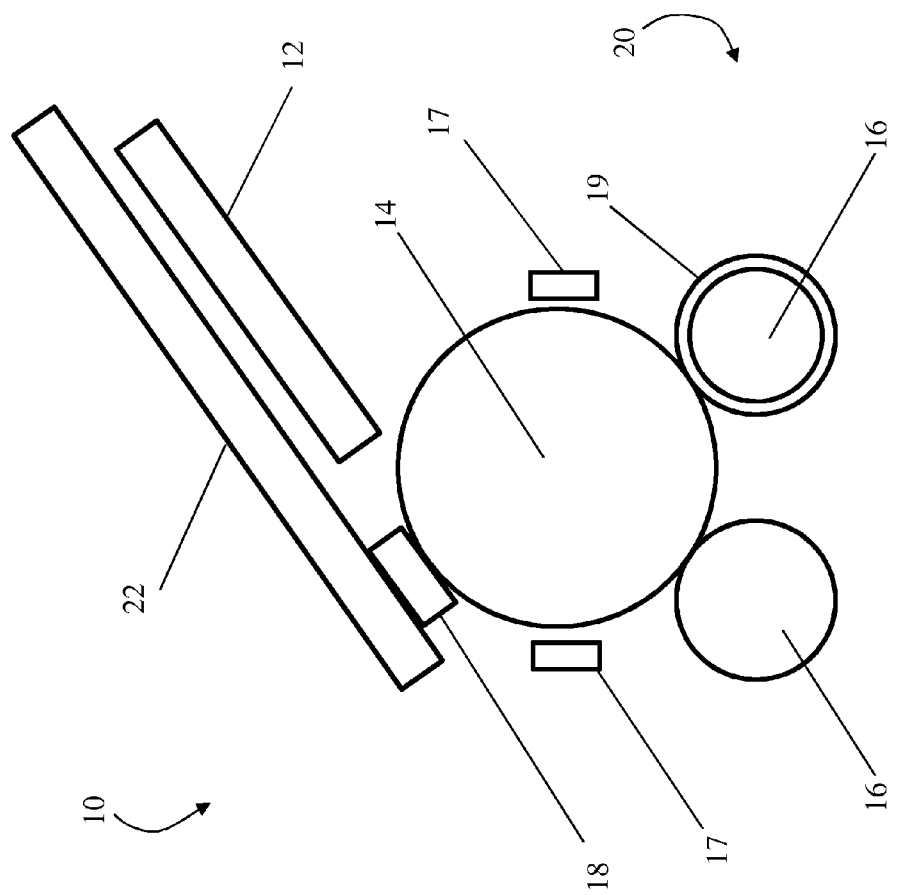
FIG. 2 is a schematic view of an alternative embodiment of the pasteurizing apparatus shown in FIG. 1.

In alternative embodiments, following RF heating, the egg 14 may be retained in the RF heating apparatus 10 (as shown in FIG. 1 or 2) and the egg 14 and apparatus 10 may simply be submerged in a hot water bath until the egg 14 is pasteurized.

In further alternative embodiments, following the egg yolk heating process, the temperature of the water applied by the applicator tube(s) 12 may be significantly increased so that hot (rather than tepid) water is applied to the egg 14. The albumen is then pasteurized by the application of the hot water from the applicator(s) 12 rather than from a water bath. In even further alternative embodiments, following the RF yolk heating process, the egg 14 may be placed in a moist hot air environment to complete pasteurization.

EXAMPLES

*Escherichia coli* (ATCC 35218) was maintained on tryptic soy agar (TSA; Becton, Dickinson and Company, Sparks, Md.) at 4° C. The RF research was performed in a food pilot plant, so *Salmonella* could not be used; however, *E. coli* (ATCC 35218) has been determined to have slightly greater thermal resistance than *Salmonella*. The *E. coli* was cultured in tryptic soy broth (Becton, Dickinson and Company) with shaking at 37° C. for 16-18 hours.

Shell eggs were obtained from a local commercial egg producer. Eggs were sorted to obtain eggs weighing 57 to 61 grams each and were stored overnight at room temperature (23 C) prior to being inoculated. The large ends of the eggs were first perforated by hand with an 18 gauge sterile needle. Following shell perforation, eggs (with the large end up) were placed in an inoculation device (designed and assembled in-house) that consistently injected *E. coli* culture into the centers of the yolks. The device was composed of a Hamilton, Gastight model 1725LT, luer tip, autoclavable, 250 µl glass syringe and a 16 gauge, 3.8 cm needle that were clamped to a low-speed actuator.

The glass syringe was filled with stationary phase *E. coli* culture and centered over the hole in the large end of the egg. The actuator slowly pushed the tip of the needle through the hole to a depth of 3.2 cm and into the center of the yolk. Eggs were then slowly injected with 50 µl of inoculum. This was followed by a 30 second waiting period to allow pressure equilibration within the egg to prevent inoculum leakage from the yolk. The actuator then slowly retracted the needle and the egg hole was sealed with a drop of fast-curing epoxy gel and allowed to cure for at least 30 min before pasteurization treatments.

Preliminary trials using a dye technique were done to confirm that cultures were inoculated into the geometric center of the yolks. This technique consisted of injecting 50 µl of dye into the egg followed by a standard hard-boiling procedure to demonstrate consistent placement of the dye near the center of the yolk with no detectable drift. Some eggs were inoculated with 50 µl of *E. coli* culture at a depth of 1 cm (instead of 3.2 cm) to study inactivation in the albumen. In both the yolk and albumen inoculations, the population of *E. coli* in the egg was approximately 7 log cfu/ml (control).

Following RF treatment, eggs were sampled by first aseptically cracking the contents into a stainless steel Waring Mini-Sample Blender Container (model MC2, Waring Products, Torrington, Conn.), and blending on medium speed with a Waring model LB 10G variable speed blender for 1 minute. The contents were then serially diluted with sterile 0.1% peptone solution and plated onto Petrifilm Aerobic Count Plates (3M, St. Paul, Minn.). Plates were incubated at 37° C. for 24 h before enumeration.

Some eggs were not inoculated and were used in studies to determine the temperatures of the albumen and yolk following RF treatment. The content of an egg was placed in a Petri dish and the temperatures of the albumen and yolk were measured with a type K thermocouple as well as the appearance of the albumin and yolk was determined.

Example 1

An inoculated egg was placed on rollers (as shown in FIG. 1). The electrode brushes were placed in contact with the egg using the weighted arms. Using a motor connected to the rollers, the rotational speed of the rollers was adjusted to 15 RPM. Tepid (35° C.) water was directed between the egg and the electrode brushes. The purpose of the water was to improve the coupling of RF energy to the egg and to cool the egg shell and protect the albumen from overheating. Thus, the RF energy preferentially heated the yolk.

The electrodes were then connected via a coaxial cable to a RF power supply (ModCPS1000/60, Comdel, Gloucester, Mass.). The power supply produced up to 1 kilowatt at a frequency of 60 MHz and an output impedance of 50Ω. An impedance matching network was designed into the RF energy applicator's circuit to maintain 50Ω to ensure maximum coupling of energy from the power supply. The power supply included instrumentation that measured forward and reflected power. Because of excellent matching, the reflected power was never more than 5 watts. The experimental procedure consisted of two steps. In the first step, RF energy was used to preferentially heat the yolk by applying 75 watts to an egg for 6 minutes In the second and final step, hot water was used to heat the shell and albumen to quickly inactivate bacteria that may reside there. For this purpose, the egg was disconnected from the rotating apparatus and placed in a water bath (WB) at 56.7° C. for 20 min. The temperature of the WB was measured with a type K thermocouple connected to a data logger (model HH309A, OMEGA Engineering, Stamford, Conn.).

For the case where the yolk was inoculated and the two-step (RF+WB) 26-minute process was applied, the population of *E. coli* was reduced by 6.3 log and no damage to the albumen, yolk, or any other part of the egg occurred.

When shell eggs were processed using only a 20 minutes hot water immersion (WB only), the bacterial reduction was 2.2 log and there was no visible damage. When the WB only treatment was extended to 60 minutes, the inactivation increased to 5.8 log, but the albumen had a hazy appearance.

Example 2

For treatment with RF, an applicator electrode was attached to the large end of the egg and another to the small end. The electrodes consisted of copper mesh (woven wire cloth, wire diameter 0.028 cm, open area 67.9%) that was held in place with a retaining ring of zinc plated steel (for 4.1 cm shaft diameter).

A mesh was selected because the wire structure provided excellent electrical conductivity while the spaces between the wires allowed heat to freely transfer from the shell outwards, thus preventing any localized hot spots directly below the shell in the albumen. A clamp, made of high-strength electrical insulating material applied a slight force to the electrodes which resulted in good contact between the electrodes and the egg. The egg and applicator electrodes were then covered with 35° C. deionized water by placing them in a 2.5 l plastic-walled water bath. The water cools the egg shell and protects the albumen from overheating.

The experimental procedure consisted of two steps. In the first step, RF energy was used to preferentially heat the yolk by applying 50 watts to an egg for 30 seconds, rotating the egg 180 degrees (around the axis running from the large end to the small end) for 10 seconds to improve heating uniformity, applying an additional 50 watts for 30 seconds, rotating 90 degrees for 10 seconds, applying 25 watts for 45 seconds, rotating 180 degrees for 10 seconds, and finally applying an additional 25 watts for 45 seconds.

The power was reduced in the latter segments to further prevent overheating and was compensated for by increasing the treatment times. In the second step, the egg was disconnected from the applicator electrodes and placed in a WB at 56.7° C. for 20 min.

For the case where the yolk was inoculated, the population of *E. coli* was reduced by 5.1 log. No damage was observed. The maximum temperatures of the albumen and yolk were 49 and 59° C., respectively, after the 3 minutes RF treatment (end of first step). The entire process (RF+WB) was 23 minutes.

When the RF treatment was increased to 4 minutes, the inactivation increased to 6.4 log, but the albumen appeared slightly hazy.

For the case where the albumen was inoculated (as opposed to the yolk) and the two-step (RF+WB) process was applied, the population of E. coli was reduced by 5.0 log. Thus, the two-step process outlined herein is capable of pasteurizing shell eggs independent of where the bacteria may reside.

For the foregoing reasons, it is clear that the method and apparatus described herein provides an innovative method and apparatus for pasteurizing shell eggs. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A shell egg pasteurization system comprising:
   a rotating assembly, the rotating assembly comprises a plurality of rollers;
   at least one electrode in contact with an egg;
   wherein the rotating assembly is configured to cause relative rotation between the egg and the at least one electrode, radio frequency (RF) energy is directed to the egg to at least partially pasteurize a portion of the egg, the electrode for generating radio frequency, the RF energy applied to the egg being in the range of 5 to 200 watts at a frequency of 1 to 100 Mhz.

2. The system of claim 1 wherein the system is structured so that the portion of the egg that is pasteurized is within the yolk.

3. The system of claim 1 wherein the system is structured so that at least one fluid applicator directs a stream of fluid to the egg as the RF energy is applied to the egg.

4. The system of claim 3 wherein the system is structured so that the stream of fluid cools an outer surface of the egg.

5. The system of claim 1 wherein the cooling fluid comprises water.

6. The system of claim 1 wherein the system is structured so that after the yolk of the egg is at least partially pasteurized, at least one fluid applicator directs a stream of hot water or moist hot air over the egg so that the albumen and yolk of the egg are pasteurized.

7. The system of claim 1 wherein the rotating assembly is structured so that the rotating assembly supports and rotates the egg, the egg being positioned on top of the rotating assembly.

8. The system of claim 1 wherein the rotating assembly comprises a plurality of rollers.

9. The system of claim 1 wherein the at least one electrode comprises at least a pair of electrodes.

10. The system of claim 9 wherein one or both of the electrodes comprises a brush.

11. The system of claim 9 wherein one or both of the electrodes comprises a weighted arm device.

12. The system of claim 9 wherein one or both of the electrodes comprises a portion of the rotating assembly.

13. The system of claim 9 wherein the pair of electrodes comprises an active electrode and a grounded electrode.

14. The system of claim 13 wherein the system is structured so that the RF energy is applied to the egg for a time period in the range of 2 to 10 minutes.

15. The system of claim 9 wherein the rotating assembly is structured so that the egg remains stationary and non-rotating, and the rotating assembly physically rotates the electrodes around the egg.

16. The system of claim 1 wherein the system is structured so that the rotating assembly rotates the egg at a speed in the range of 5 to 25 revolutions per minute.

17. The system of claim 1 wherein the system comprises three or more electrodes.

18. The system of claim 17 wherein the rotating assembly effectively rotates the electrodes around the egg by switching on and off the three or more electrodes, the electrodes being positioned around a circumference of the egg.

19. The system of claim 1 wherein the system is structured so that after the yolk of the egg is at least partially pasteurized, the egg is immersed in hot water.

20. A system for pasteurizing a shell egg, the system comprising:
   a rotating assembly, the rotating assembly comprises a plurality of rollers;
   wherein the system is configured to cause the egg to be selectively and systematically rotated so that RF energy is applied to the egg through an electrical conductance assembly that is in contact with the egg so that at least a portion of the yolk of the egg is pasteurized, the electrode for generating radio frequency, the RF energy applied to the egg being in the range of 5 to 200 watts at a frequency of 1 to 100 Mhz.

* * * * *

UNITED STATES PATENT AND TRADEMARK OFFICE
CERTIFICATE OF CORRECTION

| | | |
|---|---|---|
| PATENT NO. | : 8,973,492 B1 | Page 1 of 1 |
| APPLICATION NO. | : 13/796115 | |
| DATED | : March 10, 2015 | |
| INVENTOR(S) | : Geveke et al. | |

It is certified that error appears in the above-identified patent and that said Letters Patent is hereby corrected as shown below:

In the specification

Column 1, line 4, immediately after the title of the invention, please insert the following heading and paragraph:

--STATEMENT REGARDING FEDERALLY SPONSORED RESEARCH OR DEVELOPMENT

This invention was made with government support under Grant No. 02-0A-1935-012 awarded by the U.S. Department of Agriculture, Agricultural Research Service, and support under Grant No. DE-AC02-09CH11466 awarded by the Department of Energy. The government has certain rights in this invention.--

Signed and Sealed this
First Day of December, 2015

Michelle K. Lee
*Director of the United States Patent and Trademark Office*